(12) United States Patent
Frenkel et al.

(10) Patent No.: US 9,847,972 B2
(45) Date of Patent: *Dec. 19, 2017

(54) ONE WAY SECURE LINK

(71) Applicant: Waterfall Security Solutions Ltd., Rosh HaAyin (IL)

(72) Inventors: Lior Frenkel, Misgav Dov (IL); Amir Zilberstein, Yad Rambam (IL)

(73) Assignee: WATERFALL SECURITY SOLUTIONS LTD., Rosh Haayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,724

(22) Filed: Feb. 27, 2017

(65) Prior Publication Data

US 2017/0171153 A1 Jun. 15, 2017

Related U.S. Application Data

(63) Continuation of application No. 12/306,692, filed as application No. PCT/IL2006/001499 on Dec. 28, 2006.

(60) Provisional application No. 60/816,924, filed on Jun. 26, 2006.

(51) Int. Cl.
*H04L 29/06* (2006.01)
*G06F 21/56* (2013.01)
*G06F 21/30* (2013.01)
*G06F 21/51* (2013.01)

(52) U.S. Cl.
CPC .......... *H04L 63/0227* (2013.01); *G06F 21/30* (2013.01); *G06F 21/51* (2013.01); *G06F 21/567* (2013.01); *H04L 29/06755* (2013.01); *H04L 63/0209* (2013.01); *G06F 2221/2137* (2013.01); *G06F 2221/2151* (2013.01)

(58) Field of Classification Search
CPC ............ H04L 63/0227; H04L 63/0209; H04L 29/06755; G06F 21/567; G06F 21/30; G06F 21/51; G06F 2221/2151; G06F 2221/2137
See application file for complete search history.

*Primary Examiner* — Lisa Lewis
*Assistant Examiner* — Christopher C. Harris
(74) *Attorney, Agent, or Firm* — D.Kligler IP Services Ltd.

(57) ABSTRACT

A method for secure communications between a transmitting computer and a receiving computer includes transmitting data from the transmitting computer over a first one-way link to a data security engine, receiving and validating the data within the data security engine, and, after validating the data, transmitting the data from the data security engine to the receiving computer over a second one-way link.

16 Claims, 3 Drawing Sheets

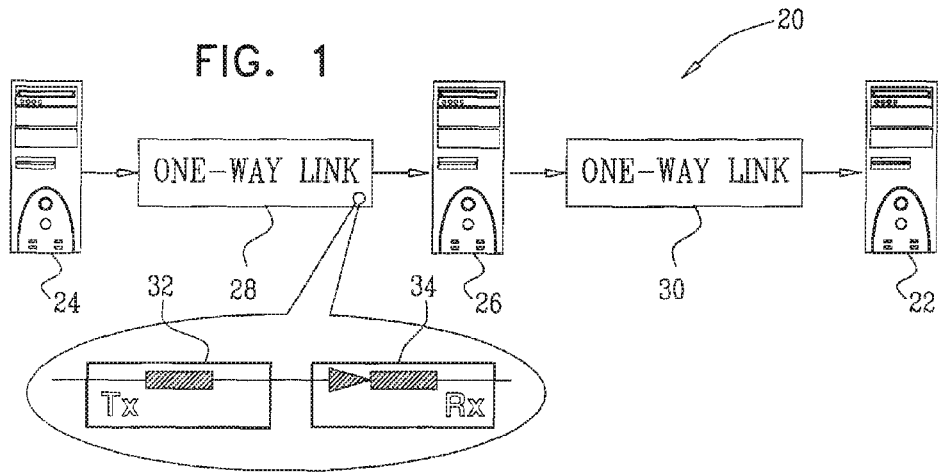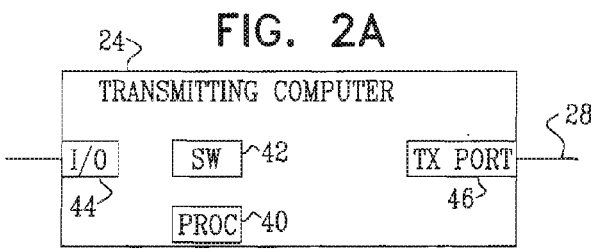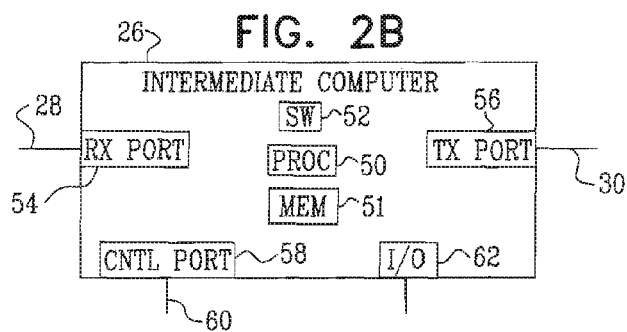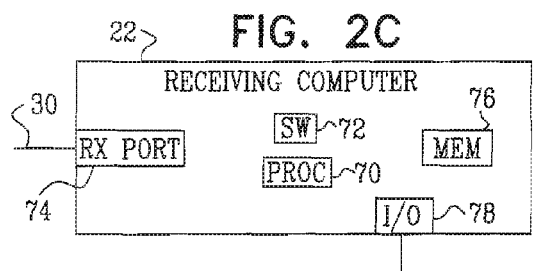

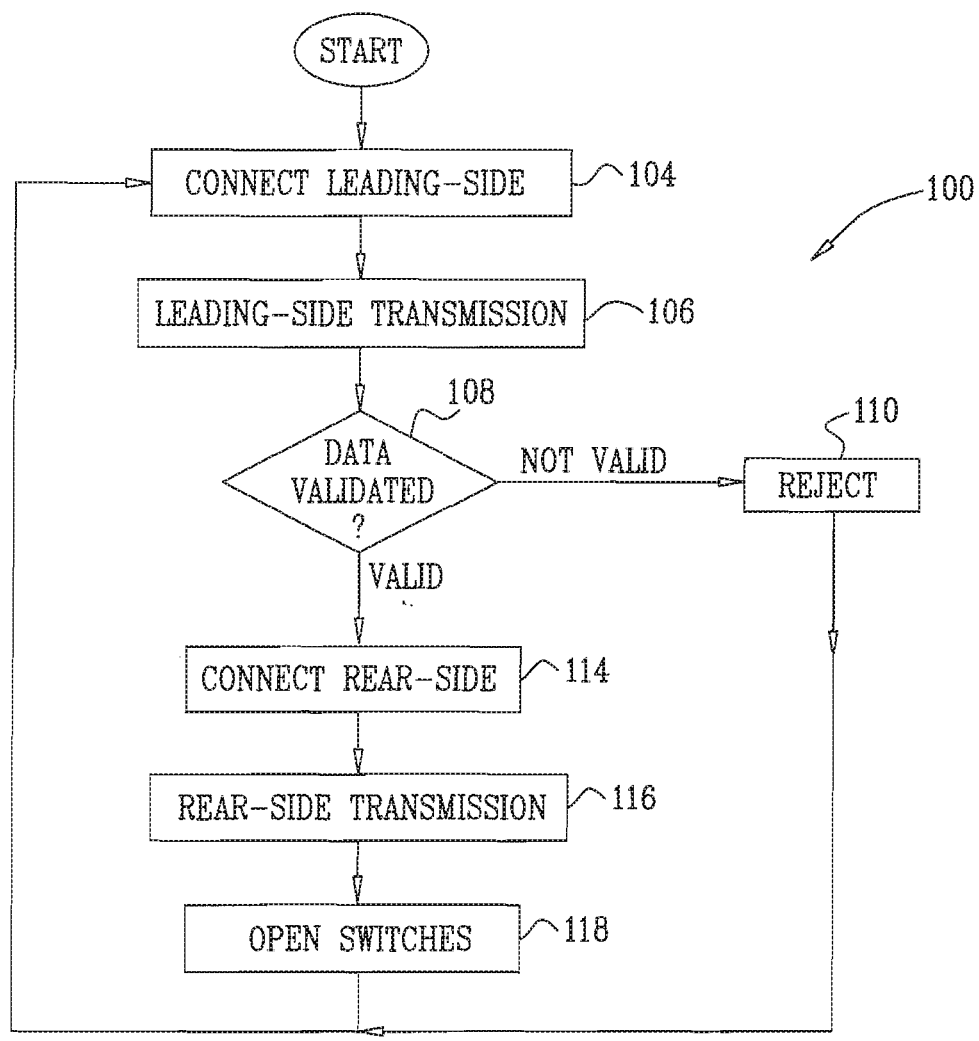

ONE WAY SECURE LINK

CROSS-REFERENCE TO RELATED APPLICATION

This application is a continuation of U.S. patent application Ser. No. 12/306,692, filed Dec. 25, 2008, in the national phase of PCT Patent Application PCT/IL06/01499, filed Dec. 28, 2006, which claims the benefit of U.S. Provisional Patent Application 60/816,924, filed Jun. 26, 2006, which is incorporated herein by reference.

FIELD OF THE INVENTION

The present invention relates generally to data communication systems, and specifically to systems and methods for computer security.

BACKGROUND OF THE INVENTION

In a computer network handling highly confidential data, such as data in military or financial environments, portions of the network may be connected by one-way data links. For example, confidential data that must not be accessed from external sites may be stored on a computer that is configured to receive data over a one-way link and has no physical outgoing link over which data might be transmitted to the external site.

One-way links may be implemented, for example, using Waterfall™ systems, which were manufactured by GITA Technologies, Ltd., and are now manufactured by Waterfall Security Solutions Ltd. (Rosh HaAyin, Israel). When a transmitting computer is connected by a Waterfall system or other one-way link to a receiving computer, the receiving computer can receive data from the transmitting computer but has no means of sending any return communications to the transmitting computer.

SUMMARY OF THE INVENTION

Embodiments of the present invention provide methods and devices for filtering data delivered to a computer over a one-way link.

In embodiments of the present invention, a physical path between a transmitting computer and a receiving computer is divided into portions comprising two or more one-way links. A device serving as a data security engine is placed between the one-way links.

The transmitting computer is configured to transmit data to the data security engine over a first one-way link. The data security engine may be configured to validate data by performing various security tests, such as testing that the data does not include viruses or other malicious software. The security tests may also include content filtering, which blocks certain types of content, as well as tests associated with content encapsulation, such as tests to authenticate the data source.

The data security engine typically buffers the data while performing the security tests. Once a set of data is validated, it is transmitted over a second one-way link to the receiving computer. Invalid data is rejected. Transmissions over the one-way links may be set to occur at designated times, such that transmissions do not occur over both the first and second one-way links at the same time.

For added security, switches, such as relays, may optionally be used to physically connect and disconnect each one-way link, thereby ensuring that at least one portion of the physical path is always disconnected. A switch controller may be configured to control the physical switches. The designated times for transmission over each of the one-way links may be established by predefined settings or, in further embodiments, by the transmission of special control signals to the switch controller from the data security engine, or, alternatively or additionally, from the transmitting computer, the receiving computer, or an external source. Physically switching each one-way link further impedes attacks against the receiving computer by hackers and by malicious software.

There is therefore provided, in accordance with an embodiment of the present invention, a method for secure communications between a transmitting computer and a receiving computer, the method including:

transmitting data from the transmitting computer over a first one-way link to a data security engine;

receiving and validating the data within the data security engine; and after validating the data, transmitting the data from the data security engine to the receiving computer over a second one-way link.

Typically, transmitting the data over the first one-way link is performed during a first time period and transmitting the data over the second one-way link is performed during a second time period subsequent to and not overlapping the first time period. The first time period may be one of a sequence of time intervals that are defined in the transmitting computer and the data security engine prior to transmitting the data from the transmitting computer. Before the first time period, a first switch may be operated to connect the first one-way link and a second switch may be operated to disconnect the second one-way link; following the first time period, the first switch may be operated to disconnect the first one-way link; and before the second time period, the second switch may be operated to connect the second one-way link. Operating the first and second switches may include controlling the switches automatically using a switch controller. Automatic control may include sending a control signal from the data security engine to the switch controller. Alternatively or additionally, automatic control may include defining the first and second time periods in the switch controller prior to transmitting the data from the transmitting computer.

Validating the data may include determining that the data includes invalid content and rejecting the invalid content. In such an event, an alarm may also be issued.

Means of validating the data may include testing the data for malicious software, testing the data for inappropriate content, and authenticating a source of the data.

There is further provided, in accordance with an embodiment of the present invention, apparatus for secure communications between a transmitting computer and a receiving computer, the apparatus including:

a data security engine having a transmit port and a receive port and operative to receive data at the receive port, to validate the data, and to output the data after being validated at the transmit port;

a first one-way link operative to transmit the data from the transmitting computer to the receive port of the data security engine; and a second one-way link operative to transmit the data from the transmit port of the data security engine to the receiving computer.

The transmitting computer may be operative to transmit the data over the first one-way link during a first time period, and the intermediate computer may be operative to transmit the data over the second one-way link during a second time period subsequent to and not overlapping the first time period. The first time period may be one of a sequence of time intervals, which are defined by settings in the transmitting computer and in the data security engine. A first switch may be operative to connect the first one-way link before the first time period and to disconnect the first one-way link following the first time period, and a second switch may be operative to disconnect the second one-way link before the first time period and to connect the second one-way link before the second time period. A switch controller may be configured to operate the first and second switches automatically. The switch controller may be coupled to receive a control signal from the data security engine defining the first and second time periods. Alternatively or additionally, the switch controller may be configured with predefined settings defining the first and second time periods.

The data security engine may be operative to determine that the data includes invalid content and to reject the invalid content. The data security engine may also be operative to issue an alarm responsively to determining that the data includes invalid content.

The data security engine may be operative to validate the data by means that include testing the data for malicious software, testing the data for inappropriate content and authenticating a source of the data.

The present invention will be more fully understood from the following detailed description of the embodiments thereof, taken together with the drawings in which:

BRIEF DESCRIPTION OF THE DRAWINGS

FIG. 1 is a block diagram that schematically illustrates a system for protecting a computer receiving one-way transmissions, in accordance with an embodiment of the present invention;

FIGS. 2A-2C are diagrammatic illustrations of a transmitting computer, an intermediate computer, and a receiving computer, respectively, in accordance with an embodiment of the present invention;

FIG. 5 is a flow diagram of a process for transmitting data to a computer receiving one-way transmissions, in accordance with an embodiment of the present invention.

DETAILED DESCRIPTION OF EMBODIMENTS

Figure 3:
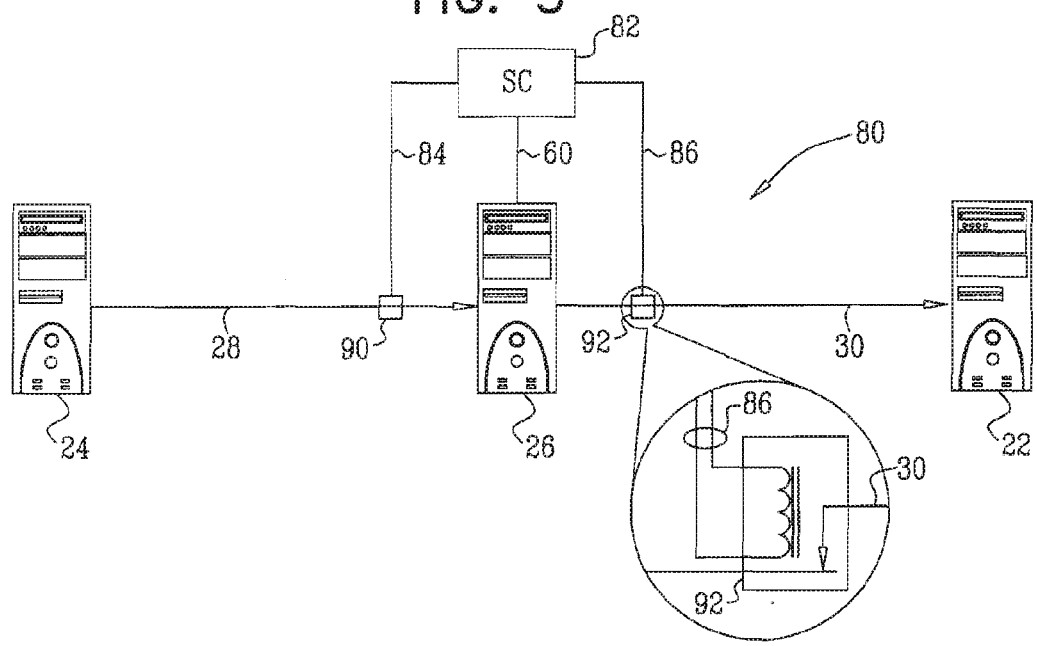
FIG. 3 is a block diagram that schematically illustrates a system for protecting a computer receiving one-way transmissions, in accordance with another embodiment of the present invention.

FIG. 1 is a block diagram that schematically illustrates a system 20 for protecting a computer 22 that receives information from a transmitting computer 24, in accordance with an embodiment of the present invention. Transmitting computer 24 and receiving computer 22 may be general-purpose computers, which run any suitable operating systems and application software. Alternatively, one or both of the transmitting and receiving computers may be special-purpose processing devices, such as storage devices or industrial controllers. Transmitting computer 24 is configured to send to the receiving computer data whose content may comprise files, e-mail, software updates, archival records, Internet information, monitoring information, industrial process logs, or substantially any other sort of computer data.

Transmitting computer 24 does not transmit this data directly to receiving computer 22 but instead transmits to an intermediate computer 26, which comprises a data security engine. Intermediate computer 26 may be a general-purpose or application-specific computer and is typically configured to run data security software described further hereinbelow. This software may be downloaded to the intermediate computer in electronic form, over a suitable communication link, or it may alternatively be provided on tangible media, such as optical, magnetic or electronic memory media. Intermediate computer 26 may buffer data received from transmitting computer 24 and subsequently may process the data using the security software to determine the data's validity.

Processing by the data security software may include determining that the received content does not comprise malicious software, such as a computer virus. Processing may also include verifying that the data conforms to pre-set protocols, which may refer to the form of encapsulation and/or the form of encryption. The security software may also authenticate the source of the data by testing, for example, a digital signature. The security software may also perform content filtering, wherein certain types of content, such as pornography, are flagged as invalid.

Following processing by the security software, intermediate computer 26 transmits validated data to the receiving computer.

The transmission of data from transmitting computer 24 to intermediate computer 26 is made over a leading-side one-way link 28. Similarly, the transmission of the validated data from intermediate computer 26 to receiving computer 22 is made over a rear-side one-way link 30. One-way links 28 and 30 may comprise any unidirectional transmission medium. For example, the unidirectional medium may be a cut RS-232 serial connection. The cut RS-232 serial connection provides only a ground wire and a wire from a transmit pin on the transmitting side of the connection to a receive pin on the receiving side, with no reverse path.

In an alternative configuration, the unidirectional medium for either or both of the one-way links may be a transmitter-receiver communications pair, such as the proprietary Waterfall system, described in the Background.

In one exemplary embodiment, a transmitter-receiver communications pair may comprise a transmitting device 32 and a receiving device 34. A connection between transmitting computer 24 and transmitting device 32 may be a standard Ethernet connection. Similarly, a connection between receiving device 34 and intermediate computer 26 may also be a standard Ethernet connection. Data to be transmitted from transmitting device 32 to receiving device 34 may be transmitted over a cut RS-232 connection, as described hereinabove, or may be communicated from an optical transmitter in the transmitting device to an optical sensor in the receiving device, thereby ensuring that there is no path of communications in the return direction.

Devices 32 and 34 are typically powered by a power source independent of the transmitted signal, such as lines power or battery power.

FIGS. 2A-2C are block diagrams that schematically illustrate elements of transmitting computer 24, intermediate computer 26, and receiving computer 22, in accordance with an embodiment of the present invention. As indicated in FIG. 2A, transmitting computer 24 generally includes a processor 40 that performs functions according to instructions of software 42. These functions may include receiving information at one or more input/output (I/O) ports 44. I/O ports 44 may connect to automated data feeds from sources such as industrial processes or the Internet. These ports may also provide means for local data input from sources such as removable storage media, a keyboard, or a scanner.

Processor 40 transmits data over leading-side one-way link 28 from a transmit port 46 to a receive port 54 on intermediate computer 26 (FIG. 2B). As described further hereinbelow with reference to FIG. 3, software 42 may include time settings that specify designated time periods for transmitting data to intermediate computer 26. Time periods set for transmitting computer 24 and for intermediate computer 26 may be synchronized using methods known in the art, such as Internet or radio time setting services that are based on atomic clocks. One such service is provided by the United States National Institute of Standards and Technology (NIST).

Designated time periods are generally determined by specifying the interval of time, such as a period of seconds or minutes, during which data may be transmitted, and by specifying the subsequent interval during which data should not be transmitted. Alternatively, the designated time periods may be specified in other forms, such as by providing specific times on a daily or weekly basis, i.e., 10:00-11:00 a.m. daily, or by providing specific times and dates. Further alternatively, transmitting computer 24 and intermediate computer 26 may transmit asynchronously, at any desired times.

Intermediate computer 26, as indicated in FIG. 2B, typically includes a processor 50 that performs functions according to instructions of software 52. These functions generally include receiving data at receive port 54 and buffering this data in a local memory 51. Software 52 typically includes data security software, as described above. Software 52 is run by processor 50 or by an external or supplemental processor to determine the validity of the received data. Intermediate computer 26 transmits data determined to be valid over rear-side one-way link 30 from a transmit port 56. Like software 42 of transmitting computer 24, software 52 may be configured with time settings that specify designated time periods for transmitting data. Software 52 may also be configured with time settings designating the allowed time periods for receiving data at receive port 54. Alternatively, as noted above, computers and 26 may transmit asynchronously, in which case the intermediate computer may transmit data immediately after validating the data, even while simultaneously receiving other data transmitted by the transmitting computer.

Intermediate computer 26 may be configured with a control port 58, through which processor 50 may send signals over a control line 60, as described further hereinbelow (FIG. 3). Additional I/O ports 62 may also be included in intermediate computer 26, thereby providing means for managing, monitoring, and updating software 52, including the data security applications therein. Alternatively or additionally, such updates may be transmitted to intermediate computer 26 through leading-side one-way link 28.

Receiving computer 22, as indicated in FIG. 2B, generally includes a processor 70 that performs functions according to instructions of software 72. These functions include receiving data at a receive port 74 from rear-side one-way link 30. Software 72 also may include functions for processing the received data and for storing it in a memory storage 76. Typically, data stored in memory storage 76 is highly confidential. Consequently, I/O ports 78, which may be included on receiving computer 22, may be restricted to local I/O access, such as access by a local computer keyboard and display.

FIG. 3 is a block diagram that schematically illustrates a system 80 for protecting a computer receiving one-way transmissions, in accordance with another embodiment of the present invention. In addition to the elements of system 20 described above, system 80 includes a switch controller 82, which controls the physical connection and disconnection of one-way links 28 and 30. In some embodiments, switches 90 and 92 are inserted into respective one-way links 28 and 30, such that these links may be physically connected and disconnected. As described above, one-way links may comprise various types of physical media, including electrical media such as a cut RS-232 connection or an Ethernet connection, which may in turn be connected to a one-way transmitter-receiver communications pair. For electrical media, switches 90 and 92 may be implemented as mechanical relays, such as a coil relay indicated by the enlarged view of switch 92 shown in FIG. 3. Switches 90 and 92 may be implemented as single-pole, single-throw (SPST), or single-pole, multiple-throw (SPMT) relays, according to the number of wires used in the physical media. For one-way links carrying digital transmissions, switches 90 and 92 may also be implemented as digital logic gates. Alternatively, when a one-way link comprises a transmitter-receiver communications pair, such as devices 32 and 34 (FIG. 1), a switch controlling the link may operate by controlling power to the devices. When either of the devices is turned off, the one-way link is effectively disconnected.

Alternatively, for one-way links comprising optical connections, switches 90 and 92 may be implemented as optical switches. Optical switches known in the art include opto-mechanical, thermo-optic, and electro-optic switches.

Switch controller 82 uses control lines 84 and 86 to control the opening and closing of respective switches 90 and 92. Opening a switch disconnects the respective link; closing the switch connects the link.

Switch controller 82 may be implemented as a programmable logic controller (PLC), as a general purpose computer, or as any similarly configured computing device.

In some embodiments, switch controller 82 is programmed with the designated time settings used by transmitting computer 24 and by intermediate computer 26, as described above. During the time period designated for transmission over leading-side one-way link 28, switch controller 82 closes switch 90 and opens switch 92. During the time period designated for transmission over rear-side one-way link 30, switch controller 82 closes switch 92 and opens switch 90. Consequently, transmission is physically prevented from occurring simultaneously over both one-way links.

In a further embodiment, switch controller 82 may receive switch control signals from an external source, such as intermediate computer 26, which transmits such signals over control line 60. The switch control signals may alternatively be received from transmitting computer 24, or from receiving computer 22, or from another, independent device.

When switch controller 82 is configured to receive switch control signals, three signals are generally defined: a first signal to connect link 28 and disconnect link 30, a second signal to connect link 30 and disconnect link 28, and a third signal to disconnect both links. The timing of these signals may be determined by a switching mode message originating from transmitting computer 24 and defining the transmission time period of a given transmission. Typically this message is delivered to intermediate computer 26. The intermediate computer may then send switch control messages to switch controller 82 based on the transmission time periods set in the switching mode message. The intermediate computer may also send a version of the switch control message to receiving computer 22, thereby notifying receiving computer 22 of the intended time period for a given transmission.

Thus, switch controller 82 may operate in two modes: a timed mode, in which switch control is determined by preset time settings; and an external control mode, in which switch control is determined by control signals received from an external source, such as the intermediate computer. The switch controller may also be configured to operate in a timed mode with an external control mode override. Operation according to these modes is described further hereinbelow.

Figure 4:
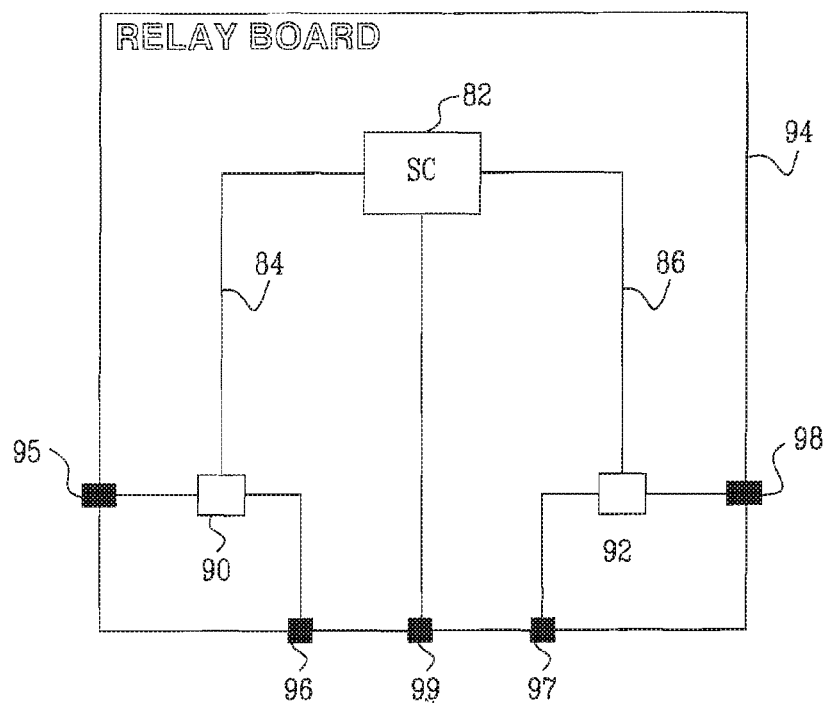
FIG. 4 is a diagrammatic illustration of a relay board used in a system for one-way transmissions, in accordance with an embodiment of the present invention.

FIG. 4 is a diagrammatic illustration of a relay board 94 comprising, as a single unit, switch controller 82 and switches 90 and 92, in accordance with an embodiment of the present invention. Relay board 94 provides a convenient means of adding elements of system 80 to the configuration of system 20. Control lines 84 and 86 are internal to the board. Switch 90 is wired to two ports on the board: an input port 95, which may be connected to leading-side one-way link 28, and an output port 96, which may be connected to receive port 54 of the intermediate computer (FIG. 2B). Similarly, switch 92 is wired to two ports, an input port 97, which may be connected to transmit port 56 of the intermediate computer (FIG. 2B), and an output port 98, which may be connected to rear-side one-way link 30. Control line 60 from the intermediate computer (FIG. 3) may be connected to an input port 99, which connects to the switch controller.

Methods for implementing the functions of relay board 94 in software on a general-purpose computer will also be apparent to one skilled in the art.

FIG. 5 is a flow diagram of a process 100 for transmitting data in system 80 to receiving computer 22, in accordance with an embodiment of the present invention. When switch controller 82 operates in a timed mode, then a step 104 is initiated when an initial designated time is reached, causing switch controller 82 to close switch 90, while opening switch 92. Alternatively, when switch controller operates in an external control mode, step 104 is initiated when a control signal is received by switch controller 82 from intermediate computer 26. The closure of switch 90 connects the leading-side one-way link between transmitting computer 24 and intermediate computer 26.

Transmitting computer 24 is typically configured to begin transmission at a time that is synchronized with the closure of switch 90. This transmission occurs as indicated at a step 106. During the transmission, transmitting computer 24 may also send a switching mode message to intermediate computer 26 establishing the time duration of the transmission.

In parallel or subsequent to the transmission of step 106, intermediate computer 26 performs, at a step 108, operations to validate the content of the transferred data. These operations, described above with reference to FIG. 1, may be performed by processor 50 or by an auxiliary processor, internal or external to the intermediate computer. If the content is determined to be invalid, comprising, for example, malicious software, then the intermediate computer does not carry out subsequent operations associated with transmitting the data to receiving computer 22, and may, instead, reject the invalid data or remove an invalid portion of the data at a step 110. Alternatively, intermediate computer 26 may archive the invalid data for subsequent analysis. Intermediate computer 26 may also record the occurrence of invalid data in a log and may issue an alarm.

If the data content is validated, then, at a step 114, switch controller 82 connects the rear-side one-way link by closing switch 92 at a step 114. To ensure that transmission does not occur simultaneously on both one-way links, the switch controller also opens switch 90.

If switch controller 82 operates in a timed mode, then step 114 is initiated when a designated time is reached. Alternatively, when switch controller operates in an external control mode, step 114 is initiated when a control signal is received by switch controller 82 from intermediate computer 26.

Subsequently, at a step 116, intermediate computer 26 transmits the validated data to receiving computer 22. When the designated time period for the transmission has elapsed (either according to the timed mode or external control mode), switch controller opens switch 92 at a step 118. In external control mode, the control signal to open both switch 90 and switch 92 is sent at step 118. Alternatively, step 118 may be skipped, and process 100 may continue at step 104, with the closure of switch 90 and the simultaneous opening of switch 92.

Although the embodiments described above use two one-way links with a single intermediate computer, in alternative embodiments (not shown in the figures), three or more one-way links may be connected in series with multiple intermediate computers.

Furthermore, although the embodiments described above relate specifically to certain types of security functions that are applied to content transmitted over a one-way link, additional types of data processing may be performed at an intermediate point on a one-way link, according to the principles of the present invention. The principles of the present invention may likewise be applied in the context of other environments and other communications technologies.

It will thus be appreciated that embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for secure communications between a transmitting computer and a receiving computer through a data security engine, the method comprising: defining a first sequence of time intervals in which the transmitting computer is allowed to transmit data to the data security engine; defining a second sequence of time intervals in which the data security engine is allowed to transmit data to the receiving computer, wherein the time intervals of the second sequence are defined such that there is no overlap between the time intervals of the first and second sequences; after defining the first and second sequences, transmitting data from the transmitting computer over a first one-way link to the data security engine, during a time interval included in the first sequence; receiving and validating the data within the data security engine; after validating the data, buffering the validated data in the data security engine until a time interval of the second sequence; and transmitting the data from the data security engine to the receiving computer over a second one-way link during the time interval of the second sequence, wherein both the transmission from the transmitting computer to the security engine and from the security engine to the receiving computer are performed over one way links which physically can carry data in only one direction.

2. The method of claim 1, and comprising:
before the time intervals of the first sequence, operating a first switch to connect the first one-way link and operating a second switch to disconnect the second one-way link;
following the time intervals of the first sequence, operating the first switch to disconnect the first one-way link; and
before the time intervals of the second sequence, operating the second switch to connect the second one-way link.

3. The method of claim 2, wherein operating the first and second switches comprises controlling the switches automatically using a switch controller.

4. The method of claim 3, wherein controlling the switches comprises sending a control signal from the data security engine to the switch controller.

5. The method of claim 1, wherein validating the data comprises determining whether the data comprises invalid content and rejecting the invalid content.

6. The method of claim 1, wherein validating the data comprises testing the data for malicious software.

7. The method of claim 1, wherein validating the data comprises testing the data for inappropriate content.

8. The method of claim 1, wherein validating the data comprises authenticating a source of the data.

9. The method of claim 1, wherein the receiving computer has no means of sending return communications to the data security engine and the data security engine has no means of sending return communications to the transmitting computer.

10. Apparatus for secure communications between a transmitting computer and a receiving computer, the apparatus comprising:
a data security engine having a transmit port and a receive port that is configured to receive data at the receive port, to validate the data, and to output the data after being validated at the transmit port;
a first one-way link, which physically can carry data in only one direction, that carries the data from the transmitting computer to the receive port of the data security engine;
a second one-way link, which physically can carry data in only one direction, that carries the data from the transmit port of the data security engine to the receiving computer;
a first switch, which connects and disconnects the first one-way link;
a second switch, which connects and disconnects the second one-way link; and
a switch controller configured with a predefined first sequence of time intervals and a predefined second sequence of time intervals, wherein the time intervals are defined such that there is no overlap between the time intervals of the first and second sequences, and is configured to instruct the first switch to connect the first one-way link before the time intervals of the first sequence and to disconnect the first one-way link following the time intervals of the first sequence and to instruct the second switch to connect the second one-way link before the time intervals of the second sequence and to disconnect the second one-way link following the time intervals of the second sequence.

11. The apparatus of claim 10, wherein the data security engine determines when the data comprises invalid content and rejects the invalid content.

12. The apparatus of claim 11, wherein the data security engine issues an alarm responsively to determining that the data comprises invalid content.

13. The apparatus of claim 10, wherein the data security engine validates the data by testing the data for malicious software.

14. The apparatus of claim 10, wherein the data security engine validates the data by testing the data for inappropriate content.

15. The apparatus of claim 10, wherein the data security engine validates the data by authenticating a source of the data.

16. The apparatus of claim 10, wherein the data security engine has no means of sending return communications to the transmitting computer and no means of receiving return communications from the receiving computer.

* * * * *